(No Model.) 2 Sheets—Sheet 1.
H. G. MORRIS & P. G. SALOM.
APPARATUS FOR FILLING SECONDARY BATTERY PLATES.
No. 408,986. Patented Aug. 13, 1889.
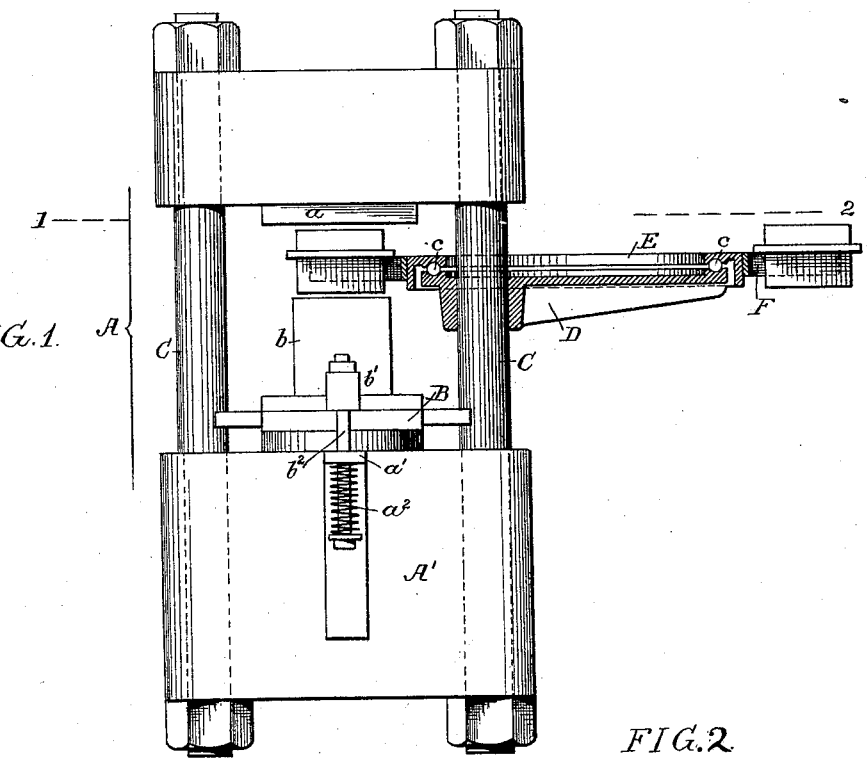
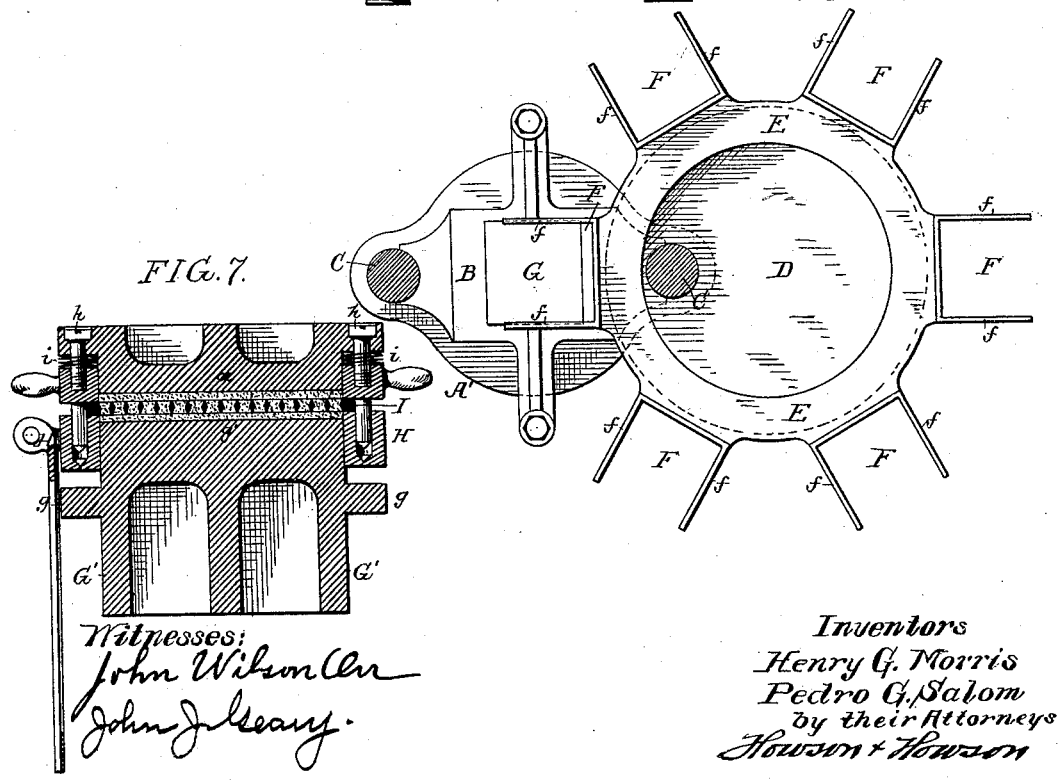
Witnesses:
John Wilson Orr
John J. Geary
Inventors
Henry G. Morris
Pedro G. Salom
by their Attorneys
Howson & Howson (No Model.) 2 Sheets—Sheet 2.

H. G. MORRIS & P. G. SALOM.
APPARATUS FOR FILLING SECONDARY BATTERY PLATES.

No. 408,986. Patented Aug. 13, 1889.

Witnesses:
John Wilson
John J. Geary

Inventors
Henry G. Morris
Pedro G. Salom
by their Attorneys
Howson & Howson

UNITED STATES PATENT OFFICE.

HENRY G. MORRIS AND PEDRO G. SALOM, OF PHILADELPHIA, PENNSYLVANIA.

APPARATUS FOR FILLING SECONDARY-BATTERY PLATES.

SPECIFICATION forming part of Letters Patent No. 408,986, dated August 13, 1889.

Application filed May 2, 1889. Serial No. 309,378. (No model.)

*To all whom it may concern:*

Be it known that we, HENRY G. MORRIS and PEDRO G. SALOM, both citizens of the United States, and residents of Philadelphia, Pennsylvania, have invented certain Improvements in Machines for Filling Secondary-Battery Plates, of which the following is a specification.

The object of our invention is to construct a machine for filling secondary-battery plates, the machine being constructed to carry out the process for which Letters Patent were granted to us on the 29th day of May, 1888, No. 383,757.

Figure 4:
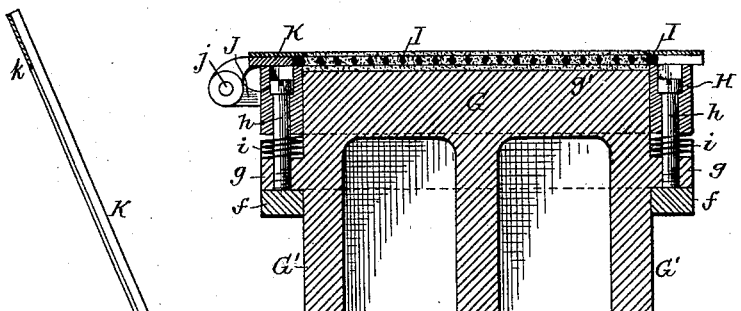
Figure 5:
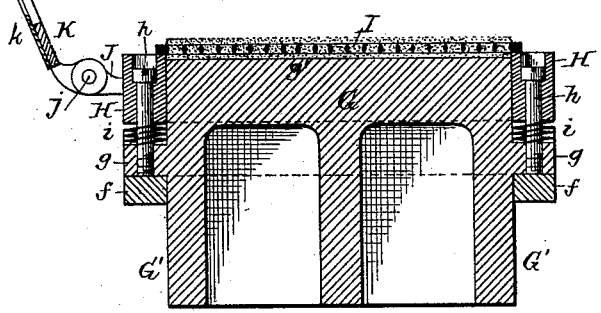
Figure 6:
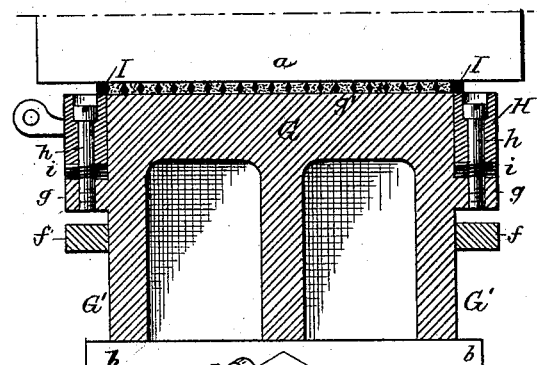
Figure 3:
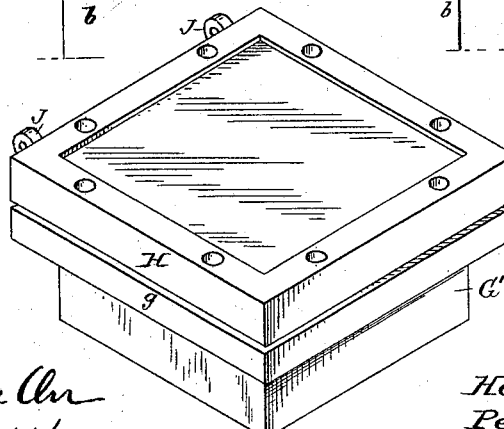

In the accompanying drawings, Figure 1 is a side view of a hydraulic press, showing our invention applied thereto. Fig. 2 is a sectional plan on the line 1 2, Fig. 1. Fig. 3 is a perspective view of the grid-carrier and lower die. Figs. 4, 5, and 6 are sectional views of the grid-carrier, lower die, and attachments, showing the grid in different stages of packing; and Fig. 7 is a sectional view showing a special form of grid-carrier and dies.

The object of the invention previously patented by us was to evenly distribute the active material of the secondary-battery plate upon the supporting-grid and to firmly and uniformly pack said material into the interstices or slots of the grid. This object was attained by placing a uniform layer of active material on one or both sides of the grid and of a sufficient height to be condensed in a solid mass in the interstices of said grid by compression.

Our present invention has reference to apparatus for facilitating the carrying out of the method of filling the plates set forth in our former patent.

In the drawings we have shown a hydraulic press A, having a stationary die or platen $a$ and a movable plunger $b$, the latter being supported by the ram B, which is adapted to the cylinder A'. On the ram B is a crosshead $b'$, having bolts $b^2$ on each side, between the head of each of which bolts and a projection $a'$ on the cylinder A' is a spring $a^2$, for returning the ram more quickly to its normal position after compressing the powdered substance.

The die or platen $a$ is supported by two vertical bolts C C; but it will be understood that any form of compression mechanism may be used, so long as two dies are used to compress the powdered substance between them.

Bolted to one of the vertical bolts C is a frame D, having an annular recess in its upper side, in which are a series of anti-friction balls $c$, as shown in Fig. 1, and these balls support a ring E, carrying a series of forks F, six being shown in the present instance; but it will be understood that any number may be employed, as circumstances require. The prongs $f f$ of the forks extend radially from the ring, and are of sufficient size to support between them the grid carrying die G, (shown more clearly in Fig. 3 to 6,) a portion G' of the die extending below the forks, so as to be acted upon by the plunger $b$, which lifts the die off the forks, thereby releasing the forks from all strain in the compression process, the dies being of sufficient strength to withstand the needed pressure. The grid-carrying dies can be readily placed on and removed from the forks, the dies having flanges $g$ extending over the forks $f$, as shown in Figs. 1 and 4. Carried by said flanges $g$ are a series of bolts $h$, which pass through a quadrangular frame H, fitting snugly to but free to slide vertically on the die, and between said frame and the flange $g$ of the die G are a series of springs $i$, which tend to force the frame H up to the limit regulated by the screw-bolt $h$.

It will be noticed that the frame H normally extends above the face $g'$ of the die G, so as to allow of a sufficient depth of active material being placed upon the face of the die G before the grid is placed thereon, the outer edges of the grid resting upon the frame H. Hinged at $j$ to a bracket J on the frame H is a second frame K, which is of a size to fit snugly around the grid, as shown in Fig. 4, and on this frame K is a flange $k$, in the present instance formed of separate plates secured to the frame K. This flange is of such thickness as to provide for the necessary amount of material above the upper face of the grid to be filled.

Powdered material being placed on the die G up to the level of the top of the frame H, the grid is placed in position on said die and frame, as shown in Fig. 4, and the hinged frame K is then moved into position over the grid, and powdered material is inserted in the interstices of the grid and leveled off, as shown, flush with the top of the frame K, after which said frame is thrown back, as shown in Fig. 5, and the carrying-ring E is so turned as to place the grid-carrying die under press. Power is then applied by the plunger b and die a of the press to compress the material into the grid, as shown in Fig. 6, the frame H being forced down to a level with the face of the die. As the material to be compressed does not extend over the rim of the supporting-grid, this solid portion of the grid will not hinder the compression of the material inside the rim, as the grid by preference is made with ribs diamond-shaped in cross-section, as shown, although other forms of ribs may be used without departing from our invention.

In order to prevent lateral displacement of the material above the grid around the edges of the latter, a top die a, having a yielding rim i, as shown in Fig. 7, may, if desired, be used, said rim retaining laterally the material above the grid before and during the pressing operation in the same manner that the frame H retains the material below the grid. The rim may have steady-pins I entering openings in the frame H, if desired.

We claim as our invention—

1. In a machine for compressing powdered active material into supporting-grids, the combination of a rotatable table having a series of holders thereon, with grid-carrying dies adapted to said holders and with a press having a plunger and platen, the rotating frame being so hung in respect to the plunger and platen of the press that as the frame is rotated the grid-carrying bars will be passed between said plunger and platen, substantially as described.

2. The combination of the frame of the press having upright bolts with a frame secured to one of said bolts, an annular frame supported by and free to turn on said fixed frame and having a series of holders, with grid-carrying dies adapted to said holders, the frame being so hung in respect to the plunger and platen of the press that the grids can be fed one by one between said platen and plunger, substantially as described.

3. The combination of the press, a grid-carrying die, and a frame movable on said die and serving to aid in supporting the grid above the surface of the die, substantially as specified.

4. The combination of the grid-carrying die, the supporting-frame for the grid, springs under said supporting-frame, and adjustable bolts for adjusting the height of said frame in respect to the face of the die, substantially as described.

5. The combination of the press, the grid-carrying die, the movable frame thereon, and a second frame adapted to rest upon the grid and serve as a gage for the material deposited thereon, substantially as specified.

6. The combination of the grid-carrying die and the movable frame thereon, the grid having a hinged frame adapted to fit over the grid, and having a flange forming a gage, substantially as and for the purpose set forth.

7. The combination of the press, the rotatable frame and its holder, and a grid-carrying die having flanges supported on said holders, but free to rise therefrom under the action of the press, substantially as described.

8. The combination of the grid-carrying die and its yielding frame with an upper die having a like yielding frame, substantially as specified.

In testimony whereof we have signed our names to this specification in the presence of two subscribing witnesses.

HENRY G. MORRIS.
PEDRO G. SALOM.

Witnesses:
WILLIAM D. CONNER,
HARRY SMITH.